United States Patent [19]

Lindblad

[11] 4,199,190
[45] Apr. 22, 1980

[54] DEVICE FOR USE IN CONNECTION WITH SAFETY BELTS

[76] Inventor: Stig M. Lindblad, Stockabo, S-440 20 Värgärda, Sweden

[21] Appl. No.: 909,982

[22] Filed: May 26, 1978

[30] Foreign Application Priority Data

May 26, 1977 [SE] Sweden ............................ 7706162

[51] Int. Cl.$^2$ ...................... A47C 31/00; A44B 19/00
[52] U.S. Cl. .................................. 297/468; 24/73 A; 24/230 A; 297/482
[58] Field of Search .................... 24/230 A, 73 A; 297/482, 468, 470; 280/801, 802

[56] References Cited

U.S. PATENT DOCUMENTS

| | | | |
|---|---|---|---|
| 3,328,064 | 6/1967 | Simon | 24/73 A |
| 3,692,361 | 9/1972 | Ivarsson | 297/385 |
| 3,785,701 | 1/1974 | Gilmore | 297/385 |
| 3,955,056 | 5/1976 | Lindblad | 24/230 A |
| 4,050,827 | 9/1977 | Jonda | 24/73 A |
| 4,070,038 | 1/1978 | Bergman | 297/482 |
| 4,119,344 | 10/1978 | Kondo | 297/385 |
| 4,157,602 | 6/1979 | Pennell | 24/73 A |

FOREIGN PATENT DOCUMENTS 2244419 3/1974 Fed. Rep. of Germany ........... 297/481

*Primary Examiner*—James T. McCall

[57] ABSTRACT

The present invention relates to a device in connection with safety belts for vehicles for detachable fastening of a safety belt at least to one of its fastening points and substantially comprises a semi rigid anchoring part comprising preferably a wire and enclosed by at least one covering and which at one terminal end has a fastening fitting intended to be fastened to a fixed part of the vehicle, and a coupling part supported by the anchoring part and fastened to the other terminal end of said anchoring part. Said coupling part is intended to be used in connection with the detachable fastening of the safety belt. The anchoring part comprises a loop of said wire, both parts of which extend along each other inside the coverings of the anchoring part. Said other end of the anchoring part extends into the coupling part, which with a stress-absorbing portion extends into the loop, the two terminal ends of which are fastened to the fastening fitting at said one end of the anchoring part.

9 Claims, 8 Drawing Figures

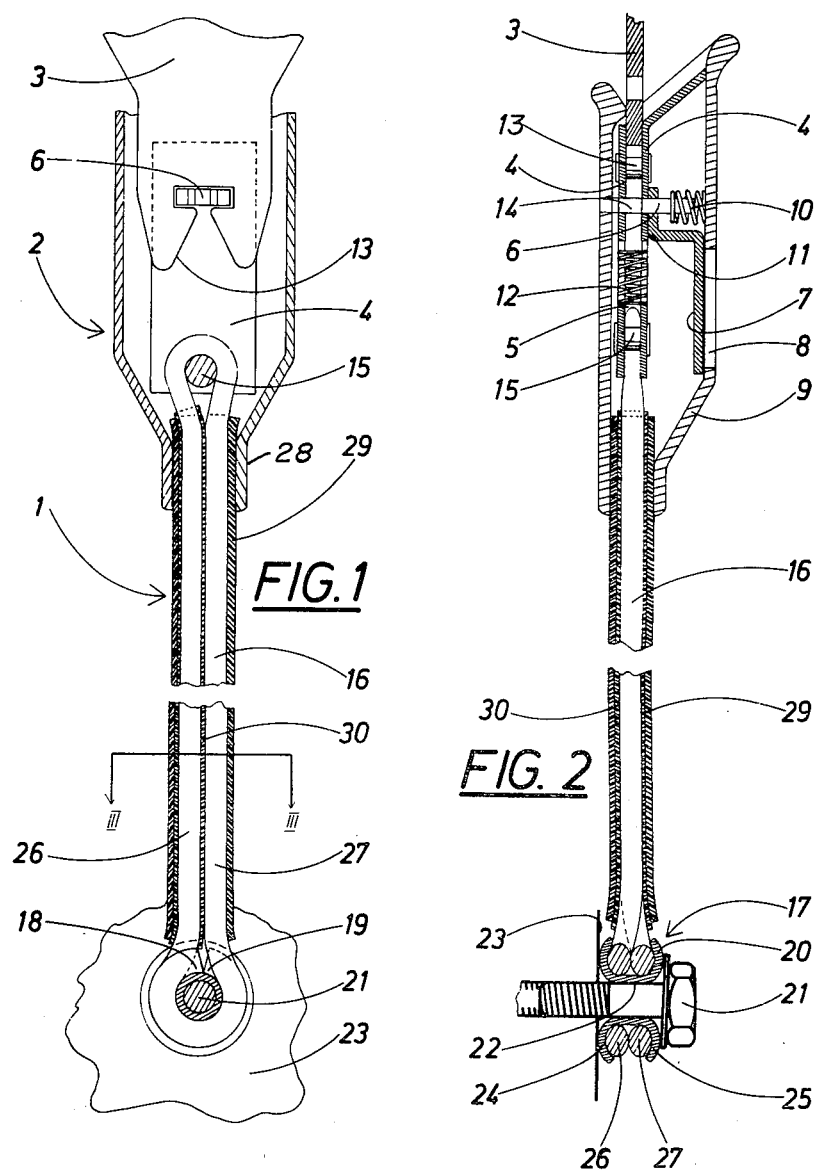

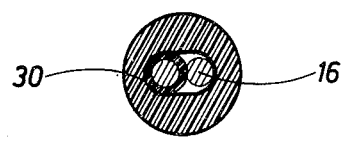
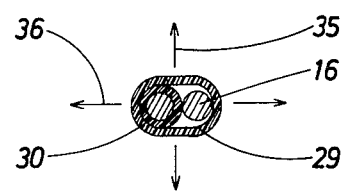
FIG. 4  FIG. 3
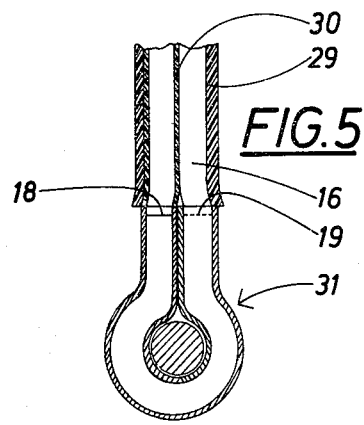
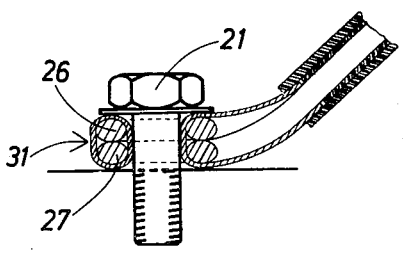
FIG. 5  FIG. 6
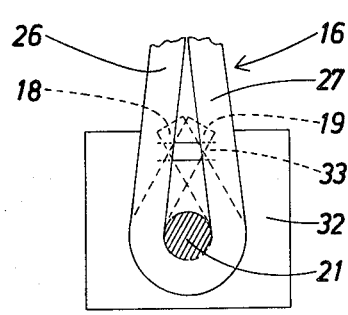
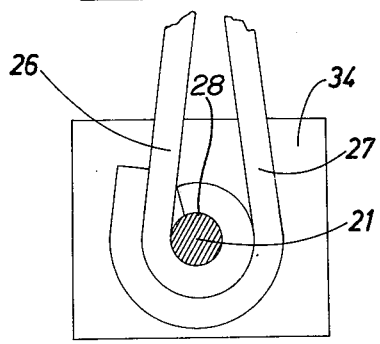
FIG. 7  FIG. 8

DEVICE FOR USE IN CONNECTION WITH SAFETY BELTS

The present invention relates to a device in connection with safety belts for vehicles for detachable fastening of a safety belt at least to one of its fastening points and substantially comprising a semi-rigid anchoring part comprising preferably a wire and enclosed by at least one covering and which at one terminal end has a fastening means intended to be fastened to a fixed part of the vehicle, and thing a coupling part supported by the anchoring part and fastened to the other terminal end of said anchoring part, said coupling part being intended to be used in connection with the detachable fastening of the safety belt.

It is an object of the present invention to provide a device, which can be manufactured at low cost and which meets the ever higher demands made by traffic authorities with respect to reliability and strength of safety belts.

Said object will be obtained by means of a device, which is characterized in that the anchoring part comprises a loop of said wire, both parts in which extend along each other inside the covering of the anchoring part and with said other end extending into the coupling part, which with a stress-absorbing portion extends into the loop, the two terminal ends of which are fastened to the fastening means at said one end of the anchoring part.

The invention will now be described in the following by means of a few examples of embodiment, reference being made to the accompanying drawings, in which the FIGS. 1 and 2 illustrate the device according to the invention in a first embodiment in longitudinal section as seen from two directions, of which one is transverse to the other, FIG. 3 is a cross-sectional view through the device along the line III—III in FIG. 1, FIG. 4 shows an imagined variant of the cross-section illustrated in FIG. 3, FIGS. 5 and 6 are sectional views of a lower fastening means in a second embodiment, while the FIGS. 7 and 8 show examples of two variants of the lower fastening means.

As is evident from the FIGS. 1 and 2 the device according to the invention substantially comprises an anchoring part 1 and a first coupling part 2 supported by the anchoring part and permitting a locked coupling together with a second coupling part 3, which is fastened to the band (not shown) of the safety belt. In the illustrated example the coupling part 2 substantially comprises two parallel stress-absorbing plates 4 of a suitable material such as metal, which plates in between them have a passage 5, into which the second coupling part 3 can be inserted, which in the illustrated example comprises a locking tongue. This tongue in a locking manner can be coupled together with the coupling part 2 by means of a locking element 6, which by means of an operating mechanism can be removed from the passage across the insertion direction of the tongue 3. The operating mechanism comprises a lever arm 7, which is accessible from outside through an opening in a casing 9, which is not subjected to the traction forces acting on the belt and can therefore be made in e.g. plastic.

The locking element 6 is in engagement with the lever arm by means of e.g. a flange and biased to its locking position (see FIG. 2) by means of a spring 10. In the locking condition the locking element 6 engages edges of the locking tongue 3 and edges of openings in the parallel plates 4, thereby transmitting the traction forces on the belt band from the locking tongue to the parallel plates. The locking element 6 can be removed from the passage 5 against the bias of the spring 10 by means of a manual pressure on the lever arm 7 through the opening 8, causing a pivoting movement of the lever arm 7 around its edge 11 and the removal of the locking element 6 to a position, releasing the locking tongue 3. A spring 12 is provided to eject the locking tongue. The tongue 3 as well as the locking element 6 have oblique edges 13, 14, known per se, cooperating when the tongue will be inserted into the passage in order to remove the locking element 6, which will be forced to the locking position as soon as the tongue 3 is inserted to the position shown in FIGS. 1 and 2. As the locking mechanism is wellknown for persons skilled in the art, its function will not be described further. The two plates 4 are connected with each other by means of a stress-absorbing rivet 15. A second rivet 13 is shown in FIG. 2. The coupling part 2 is enclosed in the casing 9.

The anchoring part 1 according to the invention comprises a loop 16 in the form of a steel wire or similar, which in its upper portion runs around the stress-absorbing rivet 15 and is thereby clamped between the two parallel plates 4, said anchoring part in its lower portion being designed in such a manner that it can be anchored for example to the floor of a vehicle, to the drive shaft housing or similar by means of a fastening means 17. The loop 16 is made in such a manner that it is not endless but instead has two terminals 18, 19, which in the example of the embodiment illustrated in the FIGS. 1 and 2 are rigidly anchored to the fastening means 17. Said fastening means comprises a fastening fitting 20 and a fastening element 21 in the form of a screw or similar, which extends through an opening 22 of said fastening fitting, said fastening element being intended to be fastened to the drive shaft housing 23, floor or similar of a vehicle. As is evident from the FIGS. 1 and 2 the loop 16 with its two terminal ends 18 and 19 runs around the fastening element 21 and the terminal ends in question are kept in close contact with the fastening fitting by the friction arising between the loop 16 and the fastening fitting, when the latter is in the manufacturing step clamped together with two flanges 24, 25 squeezed against each other with two interpositioned loop parts 26, 27, which are formed by the extension of the loop terminals 18, 19.

As is further evident from the FIGS. 1 and 2 the casing 9 is designed with a neck portion 28, through which the anchoring part extends. The neck portion 28 is in this connection designed in such a manner that it closely connects to the anchoring part, which is provided with a covering 29, suitably of plastic material of well adjusted flexibility. A second covering 30, made in e.g. soft plastic, encloses one of the loop parts 26, eliminating noise, arising from a direct metal contact.

The covering 29 enclosing the loop 16 can either be designed according to the cross-section illustrated in FIG. 3 with a wall having an even thickness, but, as is evident from FIG. 4, it can in the form of a variant be designed with a varying wall thickness, which with respect to flexibility in different directions affects the qualities of the anchoring part 1. The anchoring part 1 can be given suitably chosen properties from an anchoring part which strives to spring back to some extent to an unloaded position and to an anchoring part which maintains a given bending position. These properties are determined by the thickness and materials of the loop 16 and the coverings 29, 30.

A variant of the fastening fitting here indicated with 31 is illustrated in FIG. 5, where it is designed as a piece bent into the shape of a loop, in this example being of tubular shape, so that a channel is formed, in which the two loop parts 26, 27 are inserted and at least at both of their terminals 18, 19 rigidly connected with the fastening fitting, by way of example by pressing together the fastening fitting. A manner in which the fastening fitting 31 can be imagined to be anchored by means of the fastening element 21 is shown in FIG. 6, where a horizontal mounting is shown, which requires that the fastening fitting, as can be seen, is of angular shape. The loop 16 and the fastening means shown in FIGS. 5 and 6 can be made from a part of a wire and a straight metal tube with e.g. an oval cross section. The ends of the wire are introduced into the tube from opposite directions and arranged to overlap each other, where upon the tube is subjected to a large pressing force, deforming the walls of the tube against the wire so that the ends are rigidly connected to each other and to the tube by means of high friction. Thereafter the tube is bent into a desired loop shape.

In the variant illustrated in FIG. 7 the two loop parts 26, 27 are squeezed between two metal plates 32 or between a U-bent plate, the terminal ends 18, 19 being given a special anchoring between an upwards bent bandshaped portion 33 of at least one of the metal plates. When the two loop terminals 18, 19 have been inserted between the bentup portion 33 and the metal plate 32, they are clamped by the pressing down of the portion 33 in a direction towards the metal plate 32.

FIG. 8 shows an example, where the fastening fitting can comprise metal plates 34 similar to the example of embodiment shown in FIG. 7, the loop parts 26, 27, however, being laid one inside the other, whereby the total thickness of the fastening fitting can be reduced. The fastening fittings according to the FIGS. 7 and 8 are anchored by means of a fastening element 21 which is led through the center opening and arranged to press the plates together with the loop parts 26, 27 clamped between the plates.

Thus, by means of the device according to the invention a very reliable and simple anchoring of the coupling part 2 of the safety belt is obtained, in which connection said coupling part can be supported by and be kept at a distance from by way of example the floor of a vehicle even before the safety belt has been applied. This means that when the safety belt is put on, and its other coupling part 3, i.e. the locking tongue, shall be coupled together with the rigidly anchored coupling part 2, this can take place in a very easy manner by using only one hand. At the same time a possibility is obtained to vary the position of the coupling part 2 by moving it in the desired direction, which is possible by a suitably adapted flexibility of the anchoring means 1. With this arrangement a practical and as seen from the viewpoint of load application and anchoring means adjusting itself automatically and in the best possible direction independently of the size of the person carrying the belt and independently of the position of the seat of the vehicle is obtained. The anchoring means is according to a preferred embodiment designed in such a manner that the coupling part 2 does not by return spring action return to a certain neutral position, but substantially remains in a set position. As is indicated above such a characteristic is obtained by means of a suitable adaption of the relation between the thickness of the flexible covering 29, 30 around the loop 16 and the qualities of flexibility of the loop.

As is mentioned above, it is possible in connection with the anchoring device according to the invention to obtain a flexibility of the anchoring device, which is not uniform in all directions, but which has a comparatively small resistance against bending in a certain direction but a greater resistance, i.e. less susceptibility to bending, in another direction, for example at right angles to the first mentioned direction. Thus, in the embodiment illustrated in the FIGS. 1, 2 and 3 a susceptibility of bending is obtained, which is greater in the direction of the arrows 35 than in the direction of the arrows 36. This variation of the susceptibility of bending can also be changed by means of the above mentioned variation of thickness of the covering 29, as is shown in FIG. 4. With this arrangement one can, thus, either strengthen, reduce, or entirely eliminate the greater susceptibility of bending in certain directions created by means of the loop 16. In the variant shown in FIG. 4 thus a reduction or possibly an elimination of this variation of susceptibility of bending takes place.

The choice of wire is moreover essential for the strength of the device. The wire used in the loop 16 comprises a great number of threads, which are twisted, braided or arranged in such a manner that suitable bending characteristics are obtained, and that a not too deformed cross-sectional form of the wire is obtained in the loop laid round the rivet 15 and the fastening means also, when the load is heavy.

I claim:

1. A device for detachably fastening a safety belt for a vehicle at least to one of its fastening points comprising a semi-rigid anchoring part in the form of a wire loop, at least one covering enclosing said anchoring part, both portions of said loop extending alongside each other inside of said covering and having terminal ends, a a coupling part supported at one end of said anchoring part remote from said terminal ends for detachably fastening the safety belt, said one end of said anchoring part extending into said coupling part, a stress-absorbing portion on said coupling part extending into said loop, and a fastening means at the other end of said anchoring part comprising a fastening fitting provided with an opening and a fastening element extending through said opening for fastening to a fixed part of the vehicle, said terminal ends of said loop being fastened to said fastening means and extending around said fastening element.

2. A device for detachably fastening a safety belt for a vehicle at least to one of its fastening points comprising a semi-rigid anchoring part in the form of a wire loop, at least one covering enclosing said anchoring part, a coupling part supported at one end of said anchoring part for detachably fastening the safety belt, said loop being formed from a cut-off length of wire and having two cut-off end portions at the other end of said anchoring part and a fastening means at said other end of said anchoring part comprising a fastening fitting and a fastening element connected to said fastening fitting for fastening to a fixed part of the vehicle, said fastening fitting being in the form of a hollow tubular piece, said cut-off end portions each being introduced into respective openings in the end portions of said tubular piece and being in overlapping relationship in said tubular piece, and said tubular piece being of deformable material and compressed around said cut-off end portions in order to fix them and being bent to such a shape such that said cut-off end portions extend substantially in the longitudinal direction of said anchoring part.

3. Device according to claim 1, wherein the loop extends with its two terminal ends extending around the fastening element in directions opposite to each other.

4. Device according to claim 3, wherein the two terminal ends are held by the fastening means by friction between the terminal ends themselves and between the terminal ends and surfaces of the fastening fitting.

5. Device according to claim 1 wherein the fastening fitting comprises a piece of a tube compressed around the wire and shaped to a loop, through which the terminal ends extend.

6. Device according to claim 1 wherein the fastening fitting comprises a hub extending round the opening and two flanges radially extending from said hub, said flanges being designed in such a manner that between them they can clamp the terminal ends.

7. Device according to claim 1 wherein the fastening fitting comprises two metal plates, which are pressed together by the fastening element with the terminal ends located between said plates.

8. Device according to claim 1 wherein a second covering of a flexible material is provided around at least one loop portion and extending from the fastening means to the coupling part.

9. Device according to claim 1, wherein the covering exhibits a wall thickness, which is greater in one direction than in a direction extending transversally to said first direction.

* * * * *